United States Patent Office 3,117,959
Patented Jan. 14, 1964

3,117,959
WATER-INSOLUBLE DISAZO DYES
Johannes Dehnert, Ludwigshafen (Rhine), Germany, assignor to Badische Anilin- & Soda-Fabrik Aktiengesellschaft, Ludwigshafen (Rhine), Germany
No Drawing. Filed July 20, 1961, Ser. No. 125,368
Claims priority, application Germany July 30, 1960
6 Claims. (Cl. 260—155)

This invention relates to new water-insoluble disazo dyes, the product of these disazo dyes by coupling 4-aminoazobenzenes with 4-hydroxyquinolone derivatives, and the use of these dyes for dyeing and printing textile materials, plane shapes, shaped articles and similar materials of high molecular weight synthetic substances.

In the dyeing and printing of textile materials, such as fibers, filaments, flock, woven and non-woven textiles, plane shapes, such as films, sheets or plates, shaped articles, such as rods, tubes, balls or similar products of high molecular weight synthetic substances, such as cellulose esters, cellulose ethers, linear polyamides, linear polyurethanes, polyacrylonitrile and copolymers of acrylonitrile with other monomers, such as vinyl acetate, vinylidene cyanide or vinyl chloride, linear polyesters, such as polyethylene terephthalate or polyhexahydroterephthalyl terephthalate (marketed under the name "KODEL," a trade mark of Eastman Chemical Product Inc., Kingsport, Tennessee), it is of decisive importance that the dyes used should have not only brilliance, high color strength and good fastness to wet treatment and rubbing, but above all good fastness to light.

It is an object of this invention to provide dyes which fully satisfy these requirements.

Another object of this invention is to provide dyes which give on synthetic linear polyesters dyeings and prints of outstanding allround fastness, especially outstanding light fastness.

These and further objects are achieved by using the new dyes having the general formula:

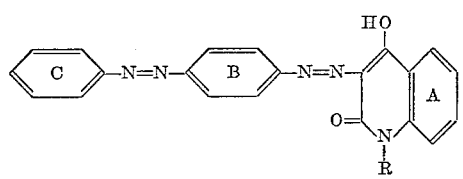

in which R denotes a hydrogen atom or a low molecular weight, substituted or unsubstituted alkyl or aryl radical which may also be combined with the carbon atom in 8-position of the quinolone skeleton, and the benzene rings A, B and C may bear further substituents but no sulfonic or carboxylic acid groups.

Examples of substituents which may be contained in the benzene rings A, B and C are halogen atoms, alkyl, hydroxyalkyl, alkoxyalkyl, cyanoalkyl, carboxyalkyl-alkyl, carbonamidoalkyl, cyanoalkyl, alkoxy, hydroxyalkoxy, carboxylic acid amide, sulfonic acid amide, cyano, carboxylic acid ester and/or nitro groups.

The valuable new dyes of this invention are obtained by coupling a diazotized 4-aminoazobenzene free from sulfonic acid and carboxylic acid groups with a 4-hydroxyquinolone-(2) of the general formula:

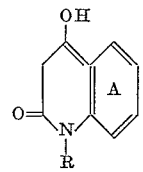

in which R has the meaning given above, and which may bear in the ring A further substituents, but no sulfonic acid or carboxylic acid groups.

Coupling is effected in the usual manner in water or in an organic solvent or in a mixture of the two. Suitable organic solvents include alcohols, such as methanol or ethanol; glycols, such as ethylene glycol or diethylene glycol; glycol ethers, such as ethylene glycol monomethyl ether; N-methylpyrrolidone, pyridine or dimethylformamide. If coupling is effected in water or mixtures of water and organic solvents, it is preferable to add dispersing agents to the coupling mixture. Polyoxyethylated sperm oil alcohols or their acid sulfuric acid esters in the form of their alkali salts or the sodium salts of the disulfonic acids of dinaphthylmethanes may for example be used as dispersing agents.

Examples of 4-aminoazobenzenes which may be used as diazo components are:

4-aminoazobenzene,
3,2'-dimethyl-4-aminoazobenzene,
2-methyl-5-methoxy-4-aminoazobenzene,
2,5-dimethoxy-4-aminobenzene,
4'-methoxy-4-aminoazobenzene,
2-methyl-4'-methoxy-4-aminoazobenzene,
3,6,4'-trimethoxy-4-aminoazobenzene,
4'-chloro-4-aminoazobenzene and
4-aminoazobenzene-4'-sulfonic acid amide.

Examples of suitable coupling components are:

4-hydroxyquinolone-(2),
1-methyl-4-hydroxyquinolone-(2),
1-ethyl-4-hydroxyquinolone-(2),
1-propyl-4-hydroxyquinolone-(2),
1-butyl-4-hydroxyquinolone-(2),
1-phenyl-4-hydroxyquinolone-(2),
1-β-hydroxyethyl-4-hydroxyquinolone-(2),
1-β-hydroxy-propyl-4-hydroxyquinolone-(2),
1-γ-hydroxypropyl-4-hydroxyquinolone-(2),
1-β,γ-dihydroxypropyl-4-hydroxyquinolone-(2),
1-β-cyanoethyl-4-hydroxyquinolone-(2),
1-β-methoxyethyl-4-hydroxyquinolone-(2),
1-β-ethoxypropyl-4-hydroxyquinolone-(2),
1-β-carboxymethyl-ethyl-4-hydroxyquinolone-(2),
1-β-carboxyethyl-ethyl-4-hydroxyquinolone-(2),
1-β-carbonamido-ethyl-4-hydroxyquinolone-(2),
1,7-dimethyl-4-hydroxyquinolone-(2),
1-β,γ-dihydroxy-propyl-8-methoxy-4-hydroxyquinolone-(2),
1-β-ethoxyethyl-7-methyl-4-hydroxyquinolone,
1-β-hydroxy-4-chloro-4-hydroxyquinolone-(2), 1-β-methoxyethyl-7-trifluoromethyl-4-hydroxy-
    quinolone-(2),
1-β-hydroxyethyl-6-chloro-4-hydroxyquinolone-(2),
1-β-cyanoethyl-6-nitro-4-hydroxyquinolone-(2),
1-β-carboxymethyl-ethyl-6-bromo-4-hydroxy-
    quinolone-(2),
1-β-methoxy-ethyl-6-chloro-4-hydroxyquinolone-(2)

and the quinolones of the following formulae:

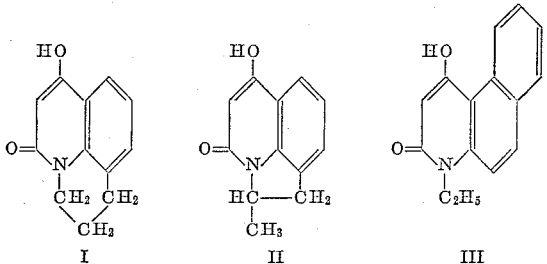

I    II    III

The preparation of quinolone I from tetrahydroquinoline and diethyl malonate is described in Berichte der Deutschen Chemischen Gesellschaft, vol. 25 (1892), p. 1194. Qinolone II is accessible in an analogous manner from 2-methylindoline and diethyl malonate. Quinolone III is obtained by boiling a mixture of 2-ethylaminonaphthalene, diethyl malonate and diphenyl ether for two hours. The other coupling components specified may be prepared according to the process described in U.S. Patent No. 2,529,924.

Dyes of the general formula:

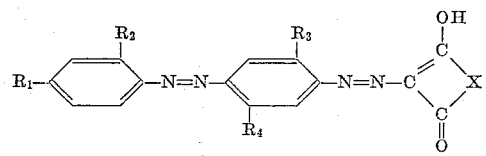

have proved particularly suitable for dyeing and printing synthetic high molecular weight organic substances, especially of linear synthetic polyesters, such as polyethylene terephthalate. They are therefore preferred for the said purpose. In the said formula, $R_1$ denotes a hydrogen atom or a halogen atom, for example, a chlorine atom, $R_2$ denotes a hydrogen atom or an alkyl group, for example a methyl group, $R_3$ denotes a hydrogen atom, an alkyl group or an alkoxy group, for example a methyl, ethyl, methoxy or ethoxy group, $R_4$ denotes a hydrogen atom, an alkyl group or an alkoxy group, for example a methyl, ethyl, methoxy or ethoxy group, and X denotes one of the divalent radicals of the formulae:

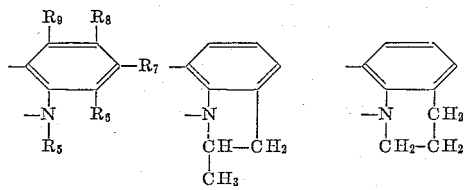

and

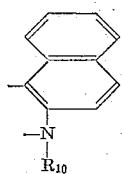

in which $R_5$ denotes a hydrogen atom, a low molecular weight alkyl group, for example a methyl, ethyl, propyl or butyl group, a phenyl group, a hydroxyalkyl group, for example a β-hydroxyethyl, β-hydroxypropyl or γ-hydroxypropyl group, a dihydroxyalkyl group, for example a β,γ-dihydroxypropyl group, an alkoxyalkyl group, for example a β-methoxyethyl, β-ethoxyethyl or γ-methoxypropyl group, a cyano-alkyl group, for example a β-cyanoethyl or β-cyanopropyl group, a carboxyalkyl-alkyl group, for example a β-carboxymethylethyl, β-carboxyethyl-ethyl or β-carboxymethyl-propyl group, or a carbonamido-alkyl group, for example a β-carbonamido-ethyl or β-carbonamido-propyl group, $R_6$ denotes a hydrogen atom or an alkoxy group, for example a methoxy or ethoxy group, $R_7$ denotes a hydrogen atom, a trifluoromethyl or alkoxy group, for example a methoxy or propoxy group, $R_8$ denotes a hydrogen atom or halogen atom, for example a chlorine or bromine atom, or a nitro group, $R_9$ denotes a hydrogen atom or a halogen atom, for example a chlorine atom or a bromine atom, and $R_{10}$ denotes a low molecular weight alkyl group, for example a methyl group or an ethyl group.

The new dyes are suitable, especially in finely divided form, for the dyeing or printing of textile materials, such as fibers, flock, filaments, woven or non-woven textiles, or shaped articles of cellulose esters or cellulose ethers or synthetic fiber-forming substances, such as linear polyamides or polyurethanes, polyacrylonitrile and copolymers of acrylonitrile, especially of synthetic linear polyesters, such as polyethylene terephthalate or polyhexahydroterephthalylterephthalate. When dyeing the last-mentioned materials, it is preferable to add dyeing accelerators ("carriers") or to use temperatures above 100° C. (high-temperature dyeing).

Suitable carriers include 2-phenylphenol, biphenyl, trichlorobenzene, methylsalicylate, p-chlorophenyl-β-hydroxyethyl ether and dimethyl terephthalate.

The invention is illustrated by, but not limited to, the following examples. The parts specified in the examples are by weight. Parts by volume bear the same relation to parts by weight as the liter to the kilogram under standard conditions. Percentages are by weight.

*Example 1*

19.7 parts of 4-aminoazobenzene is finely ground with 40 parts by volume of concentrated hydrocloric acid and, after standing for several hours, 200 parts of ice is added to the mixture and then, gradually, 30 parts by volume of a 23% aqueous sodium nitrite solution. The mixture is stirred for two hours at 0° to 5° C. 50 parts by volume of a 50% aqueous sodium acetate solution and then, while stirring, a solution of 19 parts of 1-methyl 4-hydroxyquinolone-(2) in 220 parts by volume of a 2% caustic soda solution are allowed to flow in slowly. At the same time, another 50 parts by volume of a 50% aqueous sodium acetate solution is added in small portions. The yellow dye obtained is filtered off, washed with water and dried. It dissolves in 80% aqueous acetone or in dimethylformamide with a yellow color.

0.5 part of this finely divided disazo dye is added to a bath of 3000 parts of water and 1.5 parts of the product obtained by adding on 80 moles of ethylene oxide to 1 mole of sperm oil alcohol and sulfonating the product, and 100 parts of polyethylene terephthalate film is dyed therein for 90 minutes at boiling temperature.

The golden yellow dyeing obtained is characterized by high color strength, excellent thermal stability and very good wet and light fastness properties.

The dyes of the following table are obtained in an analogous manner:

| Example No. | | Shade of dyeing on polyethylene terephthalate |
|---|---|---|
| 2 | 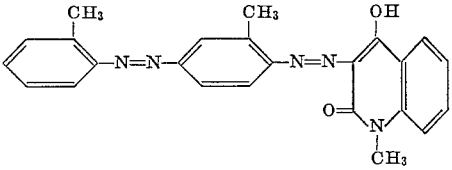 | orange. |
| 3 | 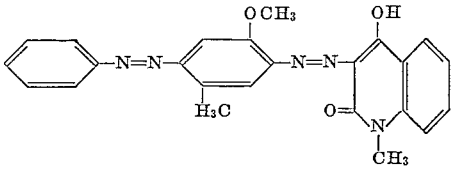 | red. |
| 4 | 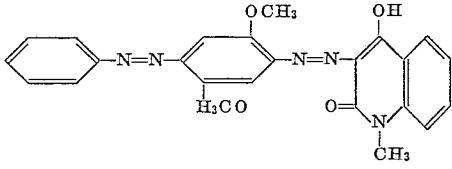 | claret. |
| 5 | 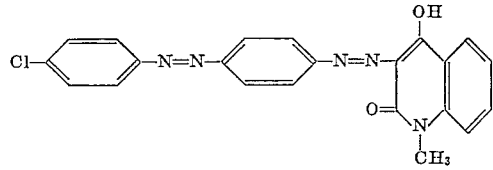 | orange. |

*Example 6*

The disazo solution obtained from 19.4 parts of 4-aminoazobenzene as described in Example 1 is allowed to flow gradually into a solution of 24 parts of 1-butyl-4-hydroxyquinolone-(2) in 500 parts by volume of dimethylformamide and then 200 parts by volume of a 50% aqueous sodium acetate solution is slowly added. When coupling is complete, the yellow dye obtained is filtered off, washed with water and dried. It is obtained in the form of a yellow-brown powder which dissolves in 80% acetone or in dimethylformamide with a reddish yellow color.

10 parts of this disazo dye is added as a finely divided powder to a paste of 360 parts of water, 600 parts of a natural gum thickening and 25 parts of 2-phenylphenol and a fabric of polyethylene terephthalate is printed with this paste. The printed fabric is dried and treated for 15 minutes with steam at 1.5 atmospheres gage. The reddish yellow print obtained exhibits excellent thermal stability and moreover has very good wet and light fastness. The same result is achieved by using diphenyl, trichlorobenzene, methyl salicylate, p-chlorophenyl-β-hydroethyl ether or dimethylterephthalate as carriers instead of 2-phenylphenol.

The following dyes are obtained in an analogous manner:

| Example No. | | Shade of dyeing on polyethylene terephthalate |
|---|---|---|
| 7 | 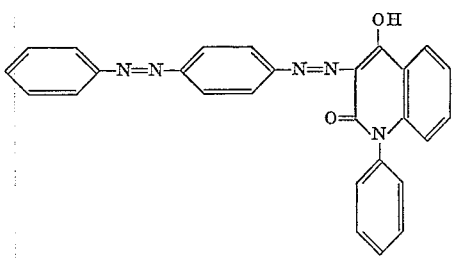 | reddish-yellow. |
| 8 | 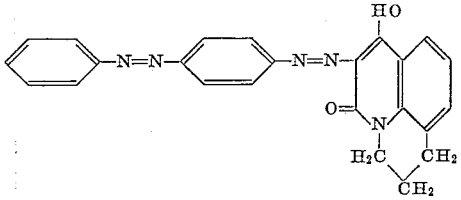 | Do. |

| Example No. | Structure | Shade of dyeing on polyethylene terephthalate |
|---|---|---|
| 9 | Ph–N=N–C6H4–N=N–[4-OH-quinolin-2(1H)-one-3-yl], N-CH(CH3)CH2– | Do. |
| 10 | Ph–N=N–C6H4–N=N–[4-OH-quinolin-2(1H)-one-3-yl], N-C2H5 | Do. |
| 11 | Ph–N=N–C6H4–N=N–[4-OH-quinolin-2(1H)-one-3-yl], N-C3H7 | Do. |
| 12 | Ph–N=N–C6H4–N=N–[4-OH-quinolin-2(1H)-one-3-yl], N-CH2–CH2OH | Do. |
| 13 | Ph–N=N–C6H4–N=N–[4-OH-7-CH3-quinolin-2(1H)-one-3-yl], N-CH3 | Do. |
| 14 | Ph–N=N–C6H4–N=N–[4-OH-quinolin-2(1H)-one-3-yl], N-H | yellow. |
| 15 | Ph–N=N–C6H4–N=N–[4-OH-quinolin-2(1H)-one-3-yl], N-CH2–CH2–CO–NH2 | reddish-yellow. |
| 16 | Ph–N=N–C6H4–N=N–[4-OH-quinolin-2(1H)-one-3-yl], N-CH2–CH(OH)–CH3 | Do. |
| 17 | Ph–N=N–C6H4–N=N–[4-OH-8-OCH3-quinolin-2(1H)-one-3-yl], N-CH2–CH(OH)–CH2OH | Do. |

| Example No. | | Shade of dyeing o polyethylene terephthalate |
|---|---|---|
| 18 | 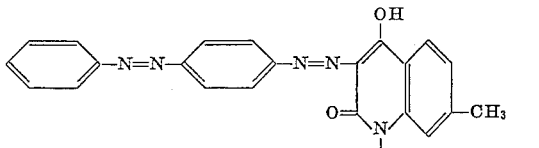 | Do. |
| 19 | 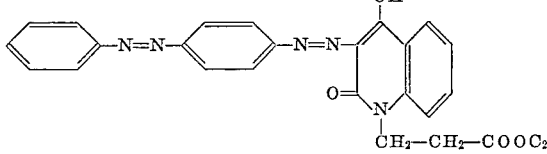 | Do. |
| 20 | 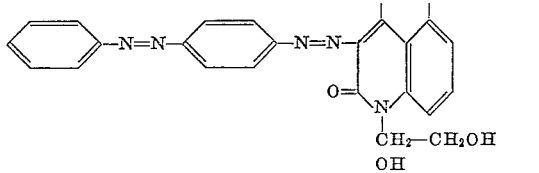 | Do. |
| 21 | 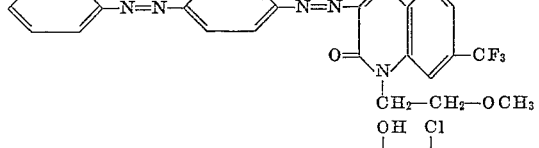 | Do. |
| 22 | 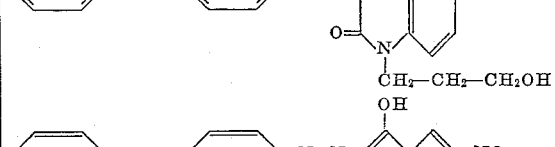 | Do. |
| 23 | 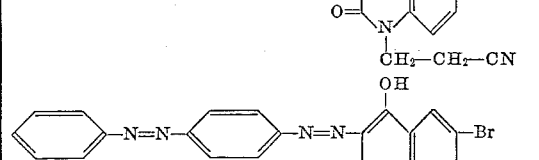 | Do. |
| 24 | 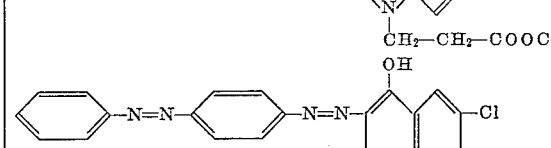 | Do. |
| 25 | 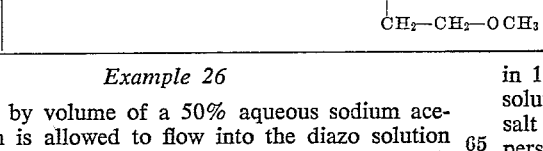 | Do. |

*Example 26*

100 parts by volume of a 50% aqueous sodium acetate solution is allowed to flow into the diazo solution prepared from 19.4 parts of 4-aminoazobenzene according to Example 1 and then, while stirring, a solution of 26 parts of the compound of the formula:

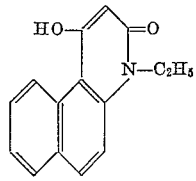

in 1000 parts by volume of a 0.5% aqueous caustic soda solution, which also contains 10 parts of the disodium salt of 1,1'-dinaphthylmethane-2,2'-disulfonic acid as dispersing agent, is allowed to flow in slowly. At the same time, another 50 parts by volume of a 50% aqueous sodium acetate solution is gradually added. The water-insoluble dye thus obtained is, after isolation and drying, an orange powder which dissolves in dimethylformamide to give a similar color.

100 parts of polyethylene terephthalate fiber is dyed for 60 minutes at 125° C. in a pressure apparatus in a bath of 2000 parts of water, 0.6 part of the said finely divided disazo dye and 2 parts of the product obtained by adding on 80 moles of ethylene oxide to 1 mole of sperm oil alcohol and subsequent sulfonation. An orange dyeing is obtained having excellent thermal stability and very good wet and light fastness properties.

I claim:

1. A water-insoluble dye of the formula

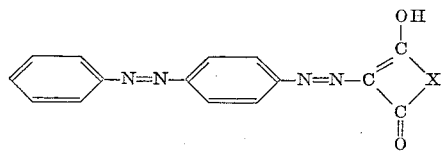

in which:

X denotes a divalent radical selected from the class consisting of the radicals of the formulae:

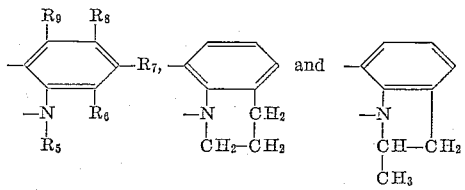

$R_5$ denotes a member selected from the class consisting of methyl, ethyl, propyl, butyl, phenyl, β-hydroxyethyl, β-hydroxypropyl, γ-hydroxypropyl, β,γ-dihydroxypropyl, β-methoxyethyl, β-ethoxy-ethyl, β-cyanoethyl, β-carboxymethyl-ethyl, β-carboxyethyl-ethyl, and β-carboamidoethyl;

$R_6$ denotes a member selected from the class consisting of hydrogen and methoxy;

$R_7$ denotes a member selected from the class consisting of hydrogen, methyl and trifluoromethyl;

$R_8$ denotes a member selected from the class consisting of hydrogen, chlorine, bromine and nitro; and $R_9$ denotes a member selected from the class consisting of hyrogen and chlorine.

2. A water-insoluble disazo dye of the formula:

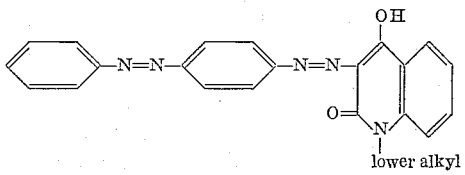

3. The dye of the formula:

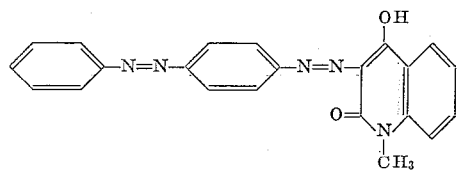

4. The dye of the formula:

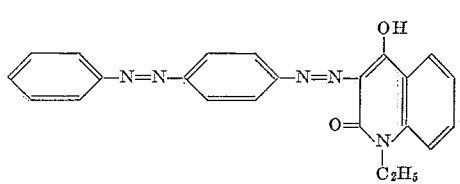

5. The dye of the formula:

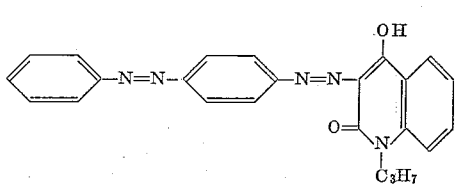

6. The dye of the formula:

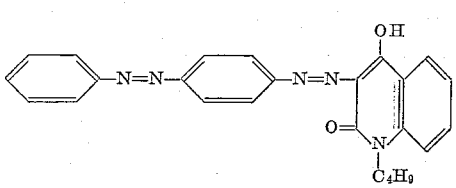

References Cited in the file of this patent

UNITED STATES PATENTS

| | | |
|---|---|---|
| 2,044,329 | Raeck et al. | June 16, 1936 |
| 2,529,924 | Dickey et al. | Nov. 14, 1950 |
| 2,883,374 | Enders | Apr. 21, 1959 |

FOREIGN PATENTS

| | | |
|---|---|---|
| 332,940 | Great Britain | July 28, 1930 |

UNITED STATES PATENT OFFICE
CERTIFICATE OF CORRECTION

Patent No. 3,117,959                             January 14, 1964

Johannes Dehnert

It is hereby certified that error appears in the above numbered patent requiring correction and that the said Letters Patent should read as corrected below.

Column 2, lines 5 to 11, the formula should appear as shown below instead of as in the patent:

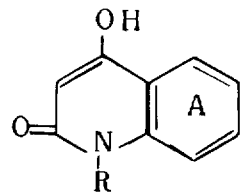

(SEAL)      Signed and sealed this 21st day of July 1964.

Attest:

ESTON G. JOHNSON  
Attesting Officer

EDWARD J. BRENNER  
Commissioner of Patents